(12) United States Patent
Vigneras et al.

(10) Patent No.: US 9,876,671 B2
(45) Date of Patent: Jan. 23, 2018

(54) METHOD AND DEVICE FOR PROCESSING COMMANDS IN A SET OF COMPONENTS OF A COMPUTER SYSTEM

(71) Applicant: BULL SAS, Les Clayes Sous Bois (FR)

(72) Inventors: Pierre Vigneras, Angervilliers (FR); Marc Girard, Antony (FR)

(73) Assignee: BULL SAS, Les Clayes Sous Bois (FR)

( * ) Notice: Subject to any disclaimer, the term of this patent is extended or adjusted under 35 U.S.C. 154(b) by 300 days.

(21) Appl. No.: 14/015,871

(22) Filed: Aug. 30, 2013

(65) Prior Publication Data

US 2014/0068049 A1    Mar. 6, 2014

(30) Foreign Application Priority Data

Sep. 3, 2012    (FR) ..................... 12 58198

(51) Int. Cl.
*G06F 15/16*    (2006.01)
*H04L 12/24*    (2006.01)
*G06F 9/48*    (2006.01)

(52) U.S. Cl.
CPC ............ *H04L 41/00* (2013.01); *G06F 9/4843* (2013.01)

(58) Field of Classification Search
CPC ..... H04L 41/00; G06F 9/4843; G06F 9/4881; G06F 9/5038
USPC ....................................................... 709/223
See application file for complete search history.

(56) References Cited

U.S. PATENT DOCUMENTS

| | | | | |
|---|---|---|---|---|
| 6,467,050 | B1 * | 10/2002 | Keung | G06F 11/0709 707/999.202 |
| 6,526,521 | B1 * | 2/2003 | Lim | G06F 11/2035 709/239 |
| 2002/0095438 | A1 * | 7/2002 | Rising, III | B60J 7/0573 715/209 |
| 2005/0257221 | A1 * | 11/2005 | Inchingolo et al. | 718/100 |
| 2006/0150188 | A1 | 7/2006 | Roman et al. | |
| 2009/0165002 | A1 | 6/2009 | Sterbenz | |
| 2010/0064009 | A1 * | 3/2010 | Chen et al. | 709/205 |
| 2011/0179419 | A1 * | 7/2011 | Gusev | G06F 9/5061 718/100 |
| 2011/0307524 | A1 * | 12/2011 | Aitken | G06F 17/30306 707/803 |
| 2012/0137298 | A1 * | 5/2012 | Periorellis et al. | 718/102 |

FOREIGN PATENT DOCUMENTS

WO    WO 2005/086842 A2    9/2005

OTHER PUBLICATIONS

Rough Grammar for Efficient and Fault-Tolerant Computing on a Distributed System by Zbigniew M. Wojcik and Barbara E. Wojcik (IEEE Transactions on Software Engineering 17.7 (Jul. 1991): pp. 652-653).*
Search Report from related French Application No. FR1258198, dated Jun. 14, 2013.

* cited by examiner

*Primary Examiner* — John MacIlwinen
*Assistant Examiner* — Tan Doan
(74) *Attorney, Agent, or Firm* — Pillsbury Winthrop Shaw Pittman LLP

(57) ABSTRACT

A method and apparatus for the processing of at least one command concerning at least one component of a cluster is disclosed. The cluster comprises several components, the at least one component having a dependency link, according to the at least one command, with at least one other component, is disclosed.

17 Claims, 6 Drawing Sheets

Fig. 6a  | nfs1#nfsd@soft | cd0#colddoor@hw | nfs2#nfs@node |

METHOD AND DEVICE FOR PROCESSING COMMANDS IN A SET OF COMPONENTS OF A COMPUTER SYSTEM

RELATED APPLICATIONS

This application claims the benefit of priority to French Patent Application No. 1258198, entitled "METHOD AND DEVICE FOR PROCESSING COMMANDS IN A SET OF COMPONENTS OF A COMPUTER SYSTEM" filed on Sep. 3, 2012. The disclosure of the above-described application is hereby expressly incorporated by reference in its entirety.

BACKGROUND

Field

The present disclosure concerns the management of computer systems and more particularly a method and device for processing commands in a set of components of a computer system such as a cluster.

Description of the Related Art

HPC (standing for "High Performance Computing") is being developed for university research and industry alike, in particular in technical fields such as aeronautics, energy, climatology and life sciences. Modeling and simulation make it possible to reduce development costs and to accelerate the placing on the market of innovative products that are more reliable and consume less energy. For research workers, high performance computing has become an indispensable means of investigation.

This computing is generally conducted on data processing systems called clusters. A cluster typically comprises a set of interconnected nodes. Certain nodes are used to perform computing tasks (compute nodes), to store data (storage nodes), or manage the cluster (administration nodes). Each node is for example a server implementing an operating system such as Linux™. The connection between the nodes is, for example, made using Ethernet™ or Infiniband™ communication links. Each node generally comprise one or more microprocessors, local memories, and/or a communication interface.

FIG. 1 is a diagrammatic illustration of an example of a topology 100 for a cluster, of fat-tree type. The latter comprises a set of nodes of general reference 105. The nodes belonging to the set 110 are compute nodes whereas the nodes of the set 115 are service nodes, e.g., storage nodes and administration nodes. The compute nodes may be grouped together in sub-sets 120 referred to herein as "compute islets," while service nodes may be grouped together as a "service islet" 115.

The nodes are linked together by switches, for example hierarchically. In the exemplary embodiment illustrated in FIG. 1, the nodes are connected to first level switches 125 which are themselves linked to second level switches 130 which in turn are linked to third level switches 135.

The nodes of a cluster as well as the other components of the cluster such as the switches are often grouped together in racks, which may themselves be grouped together into islets. Furthermore, to ensure proper operation of the computing components contained in a rack, the rack may generally comprise a cooling system, for example a cooling door (often called a cold door).

The management of a cluster, in particular the starting, stopping, or the software update of computer components in the cluster, is typically carried out from administration nodes using predetermined processes or directly by an operator. Certain operations such as starting and stopping of the whole of the cluster, islets, or racks, may also be carried out manually, by node, or by rack.

It has been observed that although the problems linked to the management of clusters do not generally have a direct influence on the performance of a cluster, they may be critical under certain circumstances. Thus, for example, if a cooling problem for a room housing racks is detected, it is often necessary to rapidly stop the cluster at least partially to avoid overheating of components which could in particular lead to the deterioration of hardware and/or data loss. However, the stopping or the starting of components of a cluster may be complex. The set of components of a computer system may be constituted by a very large number of components of different types. Further, each type of component may have particular specificities linked to its stopping or starting.

There is thus a need to improve the management of clusters, in particular to process administration commands.

SUMMARY

The present disclosure enables at least one of the problems set forth above to be solved.

The present disclosure thus relates to a computer method for processing a global command concerning a plurality of components of a set of components of a computer system, the global command concerning the execution of a respective action on each component of the plurality of components, each component having a component type, the dependency links between the components according to the command being defined by dependency rules, the method comprising for each action concerned:

identifying the component concerned by the action;
identifying, according to at least one dependency rule linked to the command, components of the plurality of components that must be processed before the component concerned;
identifying, for each type of component that must be processed in advance, a weighting representing the proportion of the components of that type for which the corresponding action must be successfully completed before executing the action concerned; and
executing the action concerned on the component concerned if for each component type that must be processed in advance the corresponding actions are successfully completed for a proportion of the components of that type at least equal to the respective weighting.

The method according to the disclosure makes it possible to process commands in a heterogeneous cluster respecting the dependency links which may exist between the different components of the cluster. Since the dependencies are associated with weightings, the importance of each dependency may be taken into account. This method may facilitate the administration of the cluster, in particular by reducing the number and the names of commands. The successful completion of an action may be indicated by a particular code or by the lack of an error code for example.

Advantageously, the execution of an action on a first component generates a contribution, that contribution being processed to determine whether the action on a component that depends on the first component may be executed or not. The method according to the embodiment of the disclosure thus makes it possible to generate, from a command and identifiers of components of a cluster, a sequence of instructions satisfying constraints relating to actions concerning components of that cluster.

According to one embodiment, the actions concerned by the global command are processed according to an ordered sequence of instructions that is determined from a dependency chart, the dependency chart being generated from dependency rules and a list of the components concerned by the global command.

Advantageously, an identification function for identifying components and a dependency rule are associated with the at least one identified dependency rule, the method further comprising a step of identifying at least the other component from the identification function, the dependency chart being generated from the at least one identified component, from the at least one other component, from the at least one identified dependency rule and from the dependency rule associated with the at least one identified dependency rule. The method according to the disclosure thus enables the set of components involved in the execution of the processed command to be determined recursively, according to different levels of granularity of the components (hardware or software).

According to a particular embodiment, the method further comprises a step of displaying information relative to the dependency chart, the step of generating the sequence of instructions being carried out in response to a validation of the information displayed relative to the dependency chart. Thus, in accordance with the method according to the disclosure, a user can view the dependency chart in order to validate it, modify it, or modify the dependency rules to regenerate, if required, a new dependency chart.

Still according to a particular embodiment, the step of generating a dependency chart is recursive and may comprise:

creating an initial dependency chart comprising at least the at least one component;

selecting a component in the dependency chart identifying at least one component on which the selected component is dependent in view of a dependency rule; and, modifying the dependency chart according to the selected component and the at least one identified component on which the selected component is dependent in view of a dependency rule.

The method according to this embodiment thus makes it possible to simply and effectively construct a dependency chart from which can be generated a sequence of instructions satisfying constraints relating to actions concerning components of that cluster for processing a command.

Advantageously, the step of selecting a component in the dependency chart is based on a rule chart, the rule chart being an ordered representation of the at least one identified dependency rule and dependency rules directly or indirectly associated with the at least one identified dependency rule.

The method according to this embodiment thus makes it possible to simply and efficiently find an order for executing actions on components of a cluster according to predetermined constraints.

According to an embodiment, generating a sequence of instructions comprises generating at least one group of instructions for each level of the dependency chart. The method according to the disclosure thus enables intelligent management of faults to avoid the loss of data and harm to equipment while executing to the greatest extent possible the instructions defined according to the command concerned.

According to an embodiment, the sequence of instructions may be generated in the form of a file of XML type, a level tag may be associated with each level of the dependency chart and a group tag may be associated with each group of instructions for each tag of level corresponding to a level for which there are at least two distinct groups of instructions.

The method according to the disclosure thus provides easy reading of the sequences of instructions linked to a command which may thus be verified and/or modified simply while limiting the risks of errors for a user.

According to an embodiment, the method further comprises a step of executing the sequence of instructions.

According to an embodiment, the method further comprises a step of displaying information relative to the sequence of instructions, executing the sequence of instructions being carried out in response to a validation of the information displayed relative to the sequence of instructions. Thus, in accordance with the method, a user may view the sequence of instructions in order to validate it, modify it, or modify dependency rules or the dependency chart that is used to regenerate, if required, a new sequence of instructions.

Advantageously, instructions relative to two distinct levels of the dependency chart are executed sequentially and according to which chart instructions of distinct groups of instructions of the same level of the dependency chart are executed in parallel. The method according to the present disclosure furthermore makes it possible to perform actions in parallel concerning several sets of components in order, in particular, to optimize the execution time of a command.

The disclosure is also directed to a computer program comprising instructions adapted to the implementation of each of the steps of the method described earlier when the program is executed on a computer as well as to a device comprising means adapted to the implementation of each of the steps of the method described herein. The advantages procured by that computer program and that device are similar to those referred to above.

DESCRIPTION OF THE DRAWINGS

Other advantages, objects and features of the present disclosure will emerge from the following detailed description, given by way of non-limiting example, relative to the accompanying drawings in which:

FIG. 6, comprising FIGS. 6a to 6f, illustrates an exemplary implementation of the algorithm described with reference to FIG. 5 according to the example described with reference to FIGS. 3 and 4.

DETAILED DESCRIPTION

This disclosure relates to the generation of sequences of instructions enabling the execution of commands concerning a set of components of a computer system such as a cluster or part of a cluster. In the context of the disclosure the term component may mean a component of software or a component of hardware such as a node, a switch, or a cold door, for example. Such commands are, for example, the stopping or the starting of a cluster or of part of a cluster such as racks or islets (set of racks). The embodiments described herein may make it possible to limit the execution time of these commands and facilitate the maintenance of clusters, while taking into account the specificities of each item of equipment.

The method according to a particular embodiment may comprise three phases, generating a dependency chart, generating a sequence of instructions, and executing that sequence of instructions. A dependency chart may be obtained on the basis of dependency rules, a list of components of a set of components such as a cluster, to which a global command is to be applied, and also on the basis of the configuration of those components. This chart may, for example, indicate that a cold door of a given rack can only be stopped after all the servers contained in that rack have been stopped or after a given proportion of the servers contained in that rack have been stopped.

The sequence of instructions generated may be in accordance with the dependency constraints expressed in the dependency chart. Thus, by way of illustration, that sequence may indicate that certain nodes may be stopped in parallel whereas certain nodes and a certain cold door may be stopped sequentially. It is advantageously optimized according to the instructions that may be executed in parallel. Lastly, the execution of that sequence of instructions may take errors into account. As a non-limiting example, if a cold door has not been correctly stopped, the switch enabling a connection to the administration network should not be turned off otherwise it may not be possible to correct the cause of the problem for lack of a connection. As a further non-limiting example, if a cold door of a rack has not been correctly started, only 50 percent of the compute nodes contained in the rack may be started.

Figure 1:
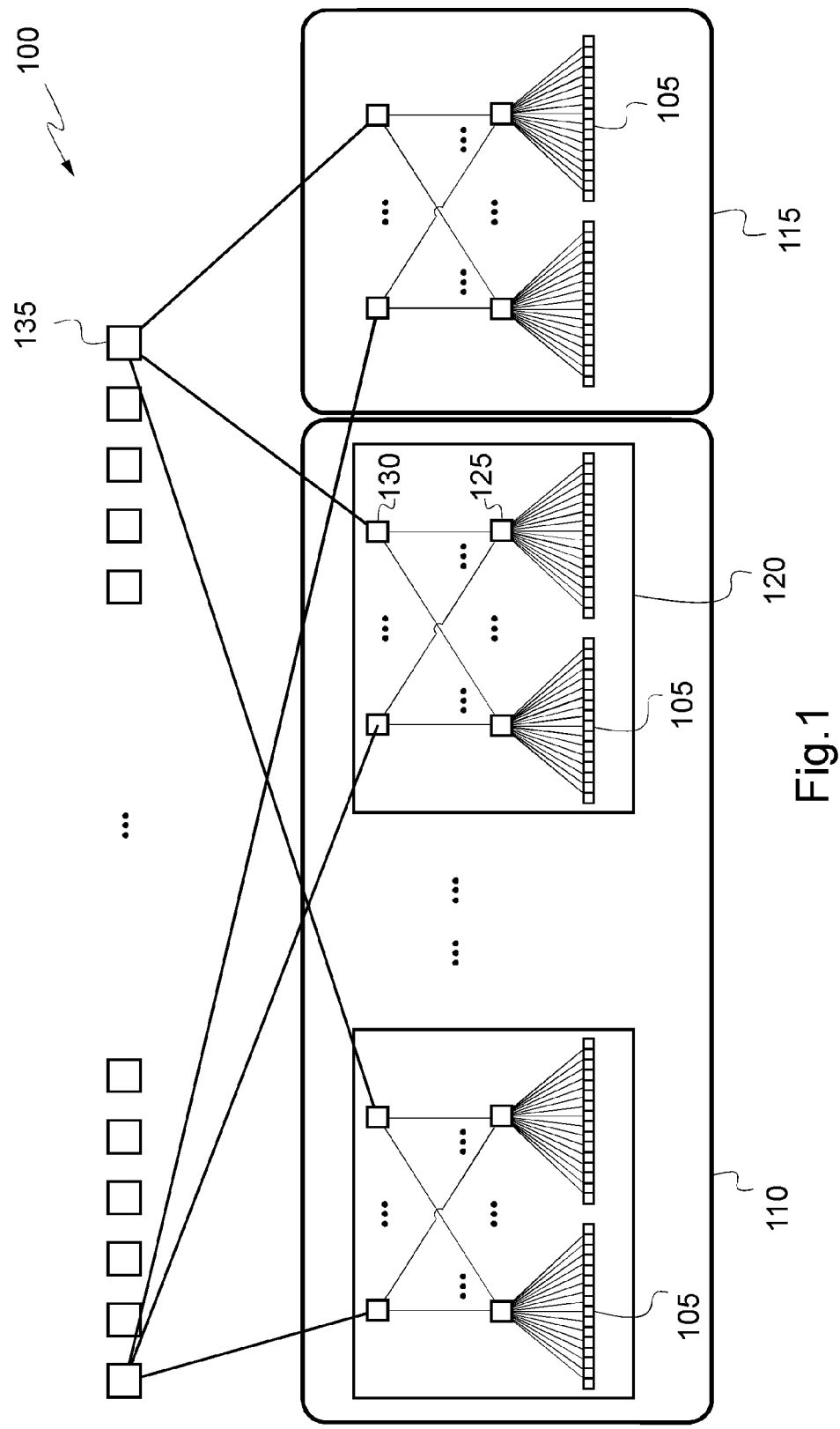
FIG. 1 illustrates an exemplary topology for a cluster.
Figure 2:
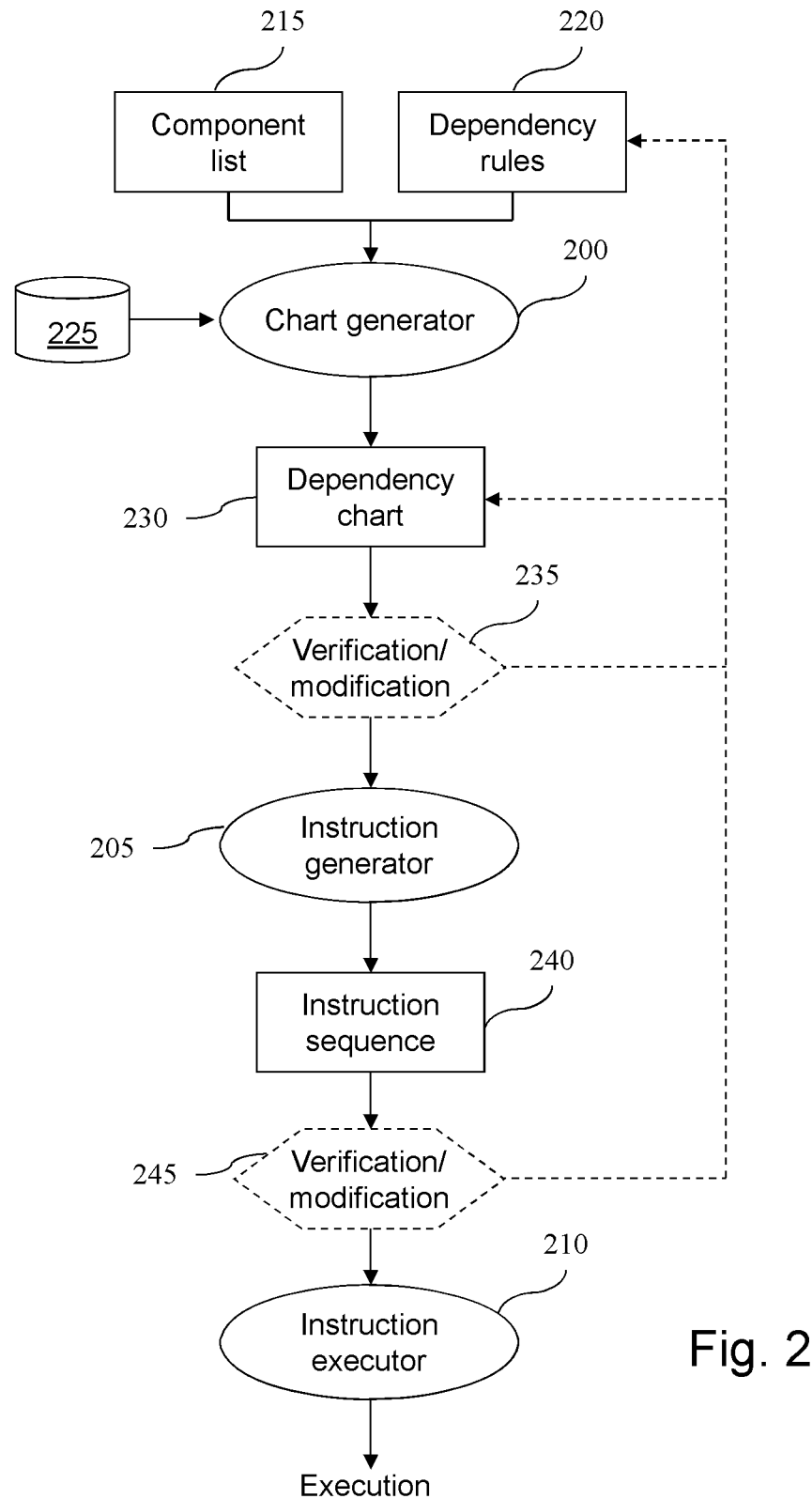
FIG. 2 illustrates an exemplary implementation of certain phases of the method disclosed herein.

FIG. 2 represents an exemplary implementation of the three phases discussed above, implemented in a dependency chart generator 200, an instruction generator 205, and an instruction executor 210, respectively.

The dependency chart generator 200 may rely on the use of a list of components 215, dependency rules 220, and data 225, characterizing the components and the links joining them together. Such an embodiment may enable the creation of a dependency chart 230, from which sequences of instructions may be generated.

The dependency chart may be obtained using a rule chart, characterizing the dependency links between the rules of the same set of dependency rules, which makes it possible to identify the roots that may be used to determine an order of application of actions to components, as described below.

The dependency chart 230 may be verified by a user (step 235) who may validate it, modify it, or modify or add dependency rules to re-generate a new dependency chart.

The dependency chart 230 may be used by the instructions generator 205 to generate a sequence of instructions 240 making it possible to execute the administration global command concerning the components determined according to dependency rules identified according to that command.

The sequence of instructions 240 may be verified by a user (step 245) who may validate it, modify it, modify the dependency chart 230, or modify or add dependency rules to regenerate a new dependency chart and re-generate a new sequence of instructions.

The sequence of instructions 240 may then be executed by the instructions generator 210. A sequence of instructions may be generated when an administration global command concerning a set of determined components must be executed or generated in anticipation to enable execution when a global command concerning a set of specific components must be executed without it being necessary to generate the corresponding sequence of instructions (the sequence of instructions may thus be executed immediately).

It is observed here that if the algorithm described with reference to FIG. 2 enables a user to verify each phase, the phases of dependency chart generation, generating sequences of instructions and executing those sequences may be executed one after the other, in a way which is transparent to the user.

The list of components 215 may identify the set of the components to which applies an administration command to process. By way of illustration, this list may be expressed by a set of expressions of the following exemplary form:

componentNamePrefix[a-b,c-d, . . . ]#type @ category where componentNamePrefix[a-b, c-d, . . . ] is a contracted standard notation to designate a set of component names having the prefix componentNamePrefix and a suffix equal to a value taken in the ranges [a-b], [c-d], etc.;

type is a description of the component considered. Thus, for example, if the component considered is a node, the type may be equal to compute to indicate that it is a compute node. These types of components are described in more detail below; and category is the category of the component considered relative to the categories defined in a database defining the components of a cluster (generally called cluster database or clusterDB). By way of illustration, the categories defined in the clusterDB used are for example the following, hwmanager or hw (this category designates controllers of hardware components, in particular of BMC type (BMC standing for Baseboard Management Controller).

disk-array or da (this category typically designates storage bays).

switch (this category typically designates switches, for example switches of Ethernet, Infiniband or PDU type);

node (this category typically designates nodes, for example compute, input/output or administration nodes);

hw_group and rack (these categories designate sets of hardware components); and, soft (this category designates all the software components of the cluster, for example a server of nfs type, nfs standing for Network File System).

The components of another embodiment of the cluster may be defined differently, as required.

It is observed that if the type@category part is missing, it may generally be recovered, for example, from the clusterDB, an error being generated if the component considered is not recovered. However, to avoid frequently interrogating the clusterDB, which may be detrimental in terms of processing time, it may be preferable to specify that parameter in the list of the components.

An example of a list of component identifiers is given in Appendix A1. According to that example, the first expression concerns components named Calcul_1, Calcul_2, and Calcul_3, corresponding to islets (islet) and defined in the ClusterDB by the category hw_group. Similarly, the fourth expression concerns a set of nine nodes named bullx12 to bullx20 which are here, compute nodes (#compute@node).

The dependency rules 220 may be the dependency rules to be applied to the components concerned by the list of components 215. The dependency rules 220 enable actions to be associated with components of a cluster and to identify dependencies between components of a cluster according to the required actions. The dependency rules 220, identified by the same name or the same administration global command identifier, may form a RuleSet, that is to say a set of rules that may be applied (according to the components concerned) to execute a called administration global command.

It is observed here that if an administration global command directly concerns a set of dependency rules, it may also indirectly concern other dependency rules which are themselves linked directly or indirectly to the dependency rules directly concerned by the administration command.

An example of dependency rules is illustrated in Appendix A2. These dependency rules may be represented here in the form of a table in which each row corresponds to a dependency rule. As indicated earlier, an administration command here may correspond to an initial selection of dependency rules. Thus, for example, the administration command called "stop" may use several dependency rules capable of applying to components of different types.

The columns of that table may be defined similar to the following:

RuleSet: name of the administration global command calling the dependency rule which is the subject of the row considered;

Symbolic name: unique symbolic name of the dependency rule corresponding to the action/component forming the subject of the row considered;

Comp. type: type of the component to which applies the dependency rule. The syntax used here may be similar to that described above, in the form type@category. Several types of components may be concerned by a dependency rule. In such case, those types may be separated by a logical symbol, for example "OR" or "|". Certain expressions such as "all" may be used to designate several types without it being necessary to define them one by one. The categories may be, for example, those defined earlier (hwmanager or hw, disk-array, switch, node, hw_group, rack and soft), the types of components may be, for example, the following, compute, login, io and mngt to characterize a function such that, for example, compute@node may designate a compute node, login@node may designate a connection node, io@node designates an input/output node and mngt@node may designate an administration node;

all may designate all the types of a given category, for example all@disk_array designates all the storage bays;

colddoor may concern the cold doors. As a cold door is a hardware component, it may be designated by colddoor@hwmanager;

eth, ib and pdu may concern types of switches for example such as eth@switch which may designate an Ethernet switch, ib@switch may designate an Infiniband switch, and pdu@switch may designate a PDU switch; and nfsd, sshd and lustre may designate software components for example such as nfsd@soft which may designate an NFS daemon, sshd@soft which may designate an SSH server and lustre@soft which may designate a lustre daemon (lustre is a trademark here designating a distributed file system).

Filter: a filter having an expression in the form "% var=~regexp" or "% var !~regexp", that may be used to select the components to which the action linked to the dependency rule is to be applied (the application of a filter is described below);

Action: an action concerned by the global administration command that may be executed for the selected components (the expression "% comp." is replaced by the name of the component considered). As described below, according to the value of the return code for the action, after its execution, the generator of the dependency chart may, according to the chosen execution mode, indicate an error and stop or continue the execution of instructions;

DepsFinder: name of a script to call which, for the given components (defined by Comp. type and Filter), returns a list of pairs (x, t) where x represents the name of a component which must be processed, typically stopped or started, before the given components or the components corresponding to the given type of components and in which t represents the type of that component. This type may be one of the types described above. A particular expression, "none," may be used where there is no dependency. This particular expression indicates that the component or components considered do not depend on other components (for the processing of the administration command concerned);

DependsOn: may be a list of symbolic names of dependency rules (included in the Symbolic name column) making references to other components or component types identified by the field DepsFinder. This list may include the dependency rules corresponding to the components or component types on which depend the components to which apply the dependency rule considered for executing the given action. A particular expression, "none," may be used when there is no dependency. This expression may be ignored if the expression "DepsFinder" is "none." The dependency rules concerned here may belong to the set of dependency rules concerned by the administration command considered.

To each component type, on which the component considered depends, there is attributed a corresponding weighting. This weighting may represent a proportion of the components of that type of component, that may influence the component considered, for which the execution of the corresponding action may be successfully completed before the execution of the action on the component is considered.

This feature may make it possible to execute an action on a component considered even if a proportion of the actions executed on the components on which it depends is not successfully completed according to the type of component. As a non-limiting example, a component of "cold door" type may be stopped if one of the two compute nodes on which it depends has not been stopped.

The weighting may be represented by a percentage from zero (0) percent to 100 percent. In such an example a weighting of zero percent may indicate that there is no dependency and that the action considered may be executed without completion of the corresponding action on components of that type, on which the component considered depends.

An example of type of component and its weighting is given below for a component considered.

| Global Command | Dependency rule | Component type | Dependencies |
|---|---|---|---|
| STOP | ColDoorOff | Colddoor | | cnode: 80, ionode: 100, sw: 0

According to this non-limiting example, the action linked to the global command "STOP" concerns the stopping of a "cold door." In order for the cold door to be stopped, a corresponding action (a stop) may be needed for successful completion of at least 80% of the compute nodes on which the cold door depends; and for all the input/output nodes (100%) on which it depends. On the other hand the stopping of the switches (sw) on which the cold door depends may not be necessary for the cold door to be stopped.

In a particular embodiment, the execution of each action may provide a contribution indicating whether the execution of the action has been successfully completed or not. This contribution may take the form of a value of the return code for the action. The contribution may then be used to determine whether the criteria indicated by the weightings linked to the following actions are satisfied or not.

By way of illustration a non-limiting example of a sequence of the actions is given in Appendix A4;

The sequence of the actions may be ordered according to the dependency chart generated in the first phase of the method. In this example:

the execution of action 1 may provide a contribution "a" when the action identified by "1" is successfully executed action 2 may be executed further to the execution of action 1 even if the execution of action 1 has not been successfully completed (no contribution "a") since the dependency weighting for the contribution "a" is equal to 0%. This dependency may be categorized as a weak dependency. A weak dependency enables an unconditional sequentially to be specified. Whatever the return code for the preceding action an action with a low dependency upon that preceding action will in all cases be executed after the preceding action. The condition for termination (with or without success) may become a necessary and sufficient condition. The execution with success of action 2 may provide a contribution "b."

Action 3 may have a strong dependency upon contribution "a" provided by the execution of action 1. This strong contribution is indicated by a weighting of 100% for contribution "a." Consequently action 3 may not be executed if action 1 has not been successfully executed. A strong dependency may enable a conditional sequentially to be specified. The successful execution of the preceding action, on which an action depends, may be a necessary condition for the execution of that action. The execution with success of action 3 also may provide a contribution "b."

action 4 may have a weighting of 50% for contribution "a" indicating that action 4 may be executed if 50% of the actions, which may provide a contribution "a," on which it depends, are successfully executed. Since, in this example, contribution "a" is only provided by a single action, action 1, the factor ½ for 50% weighting may be rounded to 1, that is to say 100%, and consequently action 4 may not be executed if action 1 has not been successfully executed; the execution with success of action 4 may provide a contribution "c".

action 5 may have a strong dependency which corresponds to a state by default when the dependency weightings are not specified. Consequently action 5 may only be executed when the executions of the actions 1 to 4 have been successfully completed. The execution with success of action 5 may provide a contribution "d".

action 6 may have a strong dependency upon contribution b and thus upon the executions of actions 2 and 3, which each provide a contribution "b". Consequently the action may only be executed if actions 2 and 3 have been successfully executed. On the other hand, if action 6 has weak dependency upon contribution "c" and thus upon the execution of action 4 which provides contribution "c." Consequently if the execution of action 4 has not been successfully completed, it will still be possible for action 6 to be executed. The execution with success of action 6 also provides a contribution "d.

Action 7 may have a low dependency upon contribution "b" resulting from the executions of actions 2 and 3 and a strong dependency upon contribution "c" resulting from the execution of action 4. Consequently, the execution of action 7 requires the completion of the execution of action 4 but does not require the completion of actions 2 and 3. The execution with success of action 7 may provide a contribution "e."

action 8 may depend on the execution of action 7 since it requires a contribution "e" of 100%, and the success of the execution of action 5 and/or 6 since it requires a contribution "d" of 50%. The completion of action 1 is not necessary for the execution of action 8. The execution with success of action 8 may also provide a contribution "e."

action 9 may depend on the completion of the execution of action 1 since the contribution of "a" may need to be at least equal to 50% and only action 1 provides contribution "a," on the execution of action 2 and/or action 3 since contribution from "b" must be at least equal to 50%; and the completion of the execution of action 4 to attain a contribution "c" of 50%.

action 10 may have a strong dependency which corresponds to a state by default when the dependency weightings are not specified. Consequently action 10 may only be executed when the executions of all the actions 1 to 9 have been successfully completed.

Comments: comments without incidence on the dependency rule.

It may be observed that the set of the dependency rules may, for example, be stored in the clusterDB.

As indicated earlier, the application of a dependency rule may comprise a step comprising a filter that may, for example, be expressed in the form "% var regexp" or "% var !~regexp" where % var may be replaced by its value during the evaluation of the expression (for example % id, % ruleset and % comp.), the operator =~ indicates that the component (% comp.) is only filtered if the expression is verified whereas the operator !~ indicates that the component is only filtered if the expression is not verified. If the expression does not begin with a known variable "% var," the expression may be interpreted as a command of shell type which, when called, specifies whether the given component must be kept (return code equal to zero) or rejected (return code different from zero). Two particular expressions "all" and "null" may be reserved to accept all the components and to reject them, respectively. By way of illustration, to accept all the components of which the name contains "bullx104," the expression "% name=~bullx104" may be used.

By way of illustration, the second dependency rule given in Appendix A2, called "nodeOn," concerns a command (RuleSet) for starting (start) for components of compute node type (compute@node). A filter is used to select only the compute nodes not containing the name compute 12 (% name !~compute 12). The dependency rule nodeOn may use the function nodectrl with the parameters poweron and % comp. the object of which is to start the selected compute nodes. The dependency rule nodeOn may use the script find nodeon_deps to identify all the components on which a component of compute node type depends for the execution of the action associated with the dependency rule nodeOn, which may be processed (here started) before each compute node considered.

In an embodiment, it is specified that the execution of the dependency rule nodeon may depend on the execution of the dependency rule ColddoorStart concerning the starting of a cold door. The weighting attributed to the dependency rule ColddoorStart in this example is 100%. In other words, a selected compute node can only be started if the cold door of the rack in which it is located has been successfully started beforehand. The dependency rule ColddoorStart may apply to the components yielded by the script DepsFinder corresponding to the dependency rule nodeOn.

Similarly, the third dependency rule given in Appendix A2, called "colddoorOff", concerns a command (RuleSet) for stopping (stop) for hardware components of cold door type (colddoor@hw). No filter is used in this example. Consequently, all the cold doors are concerned by this dependency rule. The latter uses the function bsm_power with the parameters off % comp, the object of which is to stop a cold door. The dependency rule colddoorOff uses the script find_colddoorOff_dep to identify all the components of the set which are to be processed (here, stopped) before the cold door considered. Furthermore, it may be specified that the execution of the dependency rule colddoorOff depends on the dependency rule nodeOff concerning the stopping of nodes. In this example, the weighting attributed to the dependency rule nodeOff is 50%. In other words, in this example a cold door can only be stopped if at least 50% of the nodes linked to the cold door have been stopped in advance. Stated in a different way, if the stopping of 50% of the identified nodes has not been completed, the cold door considered can still be stopped.

Furthermore, if a node cannot be stopped, it is nevertheless possible to stop the cold doors of the racks not including any node.

When a global command (RuleSet) is called to process a set of components, all the dependency rules corresponding to that command may be selected as well as, where appropriate, the dependency rules linked on account of the dependencies, directly or indirectly, to those initially selected rules. Among these selected rules, some, linked to components of the list of components, are implemented and others, linked directly or indirectly to implementation rules, may also be implemented. Certain selected rules may thus not be implemented.

Thus, according to the example given in Appendix A2, if the global command start is called, all the dependency rules corresponding to that command, including the dependency rule nodeOn, may be selected. It is observed that among these selected rules, the dependency rule ColddoorStart (not represented) may be implemented if the dependency rule NodeOn is implemented on account of the dependency.

Similarly, according to the example given in Appendix A2, if the global command stop is called, all the dependency rules corresponding to that command, including the dependency rules nodeOff, colddoorOff, daOff, nfsDown and unmountNFS are selected.

After having identified an initial set of components (list of components) a set of dependency rules and a set of components on which depend the components of the initial set of components, it may be possible to generate a rule chart which may be used for generating a dependency chart. Such a step may be carried out here in the chart generator.

The rule chart may be created from all the dependency rules identified and implemented, according to the dependency relationships and the associated weightings identified here in the field DependsOn.

Such a rule chart may make it possible, by iteration, to construct a dependency chart between all the identified components.

Figure 3:
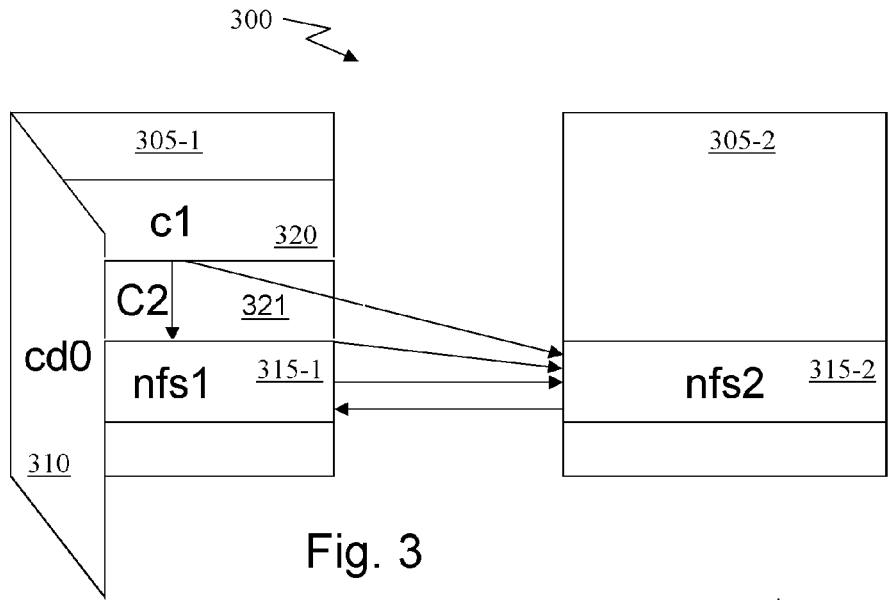
FIG. 3 represents exemplary dependency relationships between components of a cluster according to the disclosure.

By way of illustration, a cluster (particularly simplified) is considered here comprising several components linked to each other by dependency relationships some of which are illustrated in FIG. 3. The cluster 300 comprises two racks 305-1 and 305-2. The rack 305-1, cooled by a cold door 310 (called cd0), comprises a server 315-1 of NFS type (called nfs1) and two compute nodes 320, 321 (respectively called c1,c2) whereas the rack 305-2 comprises a server 315-2 of NFS type (called nfs2). In this non-limiting example, it is assumed that the server nfs1 is a client of the server nfs2, that, reciprocally, the server nfs2 is a client of the server nfs1, and that the compute nodes c1 and c2 may be clients of the servers nfs1 and nfs2.

The object is to stop (administration global command stop) the NFS daemon of the server nfs1 (component nfs1#nfsd@soft in the list of components concerned by the administration command considered), to turn off the cold door cd0 (component cd0#colddoor@hw in the list of components concerned by the administration command considered), and stop the server nfs2 (component nfs2#nfs@node in the list of components concerned by the administration command considered).

Figure 4:
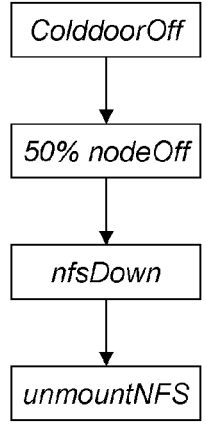
FIG. 4 illustrates an exemplary rule chart.

The constraints may be to turn off at least one of the compute nodes c1, c2 (node Off 50%) before the cold door cd0 (colddoorOff), to stop the NFS daemons (nfsDown) on the servers nfs1 and nfs2, to display a warning (unmountNFS) for each client of the NFS servers (in order to warn of the stopping of the NFS servers) and to stop the server nfs2 (nodeOff). These constraints may be expressed in rule chart form as illustrated in FIG. 4. As indicated earlier, the order of the dependency rules may be determined according to the indications associated with each of them, for example the indications of the field DependsOn described earlier.

Figure 5:
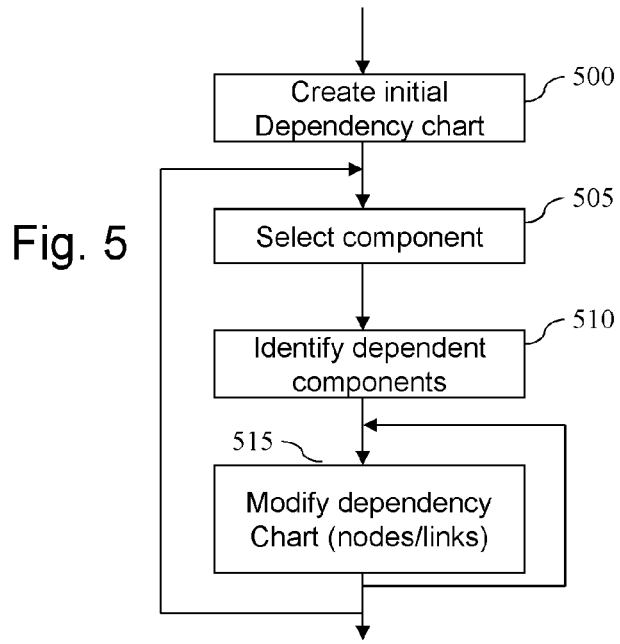
FIG. 5 illustrates certain steps of an exemplary recursive algorithm used to generate a dependency chart in accordance with the method disclosed herein.

FIG. 5 illustrates certain steps of an example of a recursive algorithm used to generate a dependency chart in accordance with an embodiment of the invention. A first step 500 is directed to creating an initial dependency chart. The latter may comprise all the components of the list of components 215 of FIG. 2 concerned by the administration global command considered.

A following step 505 consists of selecting a component in the dependency chart in course of construction. Advantageously, the component selected may be chosen on the basis of the rule chart, as being the first component of a root of the rule chart (in which roots may possibly have been deleted virtually during the construction of the dependency chart). If no component corresponds to a root of the rule chart, those roots may be deleted (virtually) and the step repeated with the resulting rule chart.

The components dependent on the selected component may then be identified (step 510). As described above, these components may be identified using dependency rules which are associated with them and scripts of the field DepsFinder.

These components may be added to the dependency chart in the course of construction then dependency links between the components of the dependency chart are added in step 515. The added components are in turn processed (according to the dependency rules defined in the field DependOn which is associated with the field DepsFinder that led to the identification of those components) to determine whether they depend on other components and the case arising to identify the weighting of the dependency. Step 515 is thus executed recursively. If a component does not depend on other components, the action associated with it (defined in the field action of the dependency rule) is stored in memory and the following component (going up in the hierarchy of the dependency chart) may be processed to determine whether all the components on which it depends have been processed and, the case arising, to store the associated action in memory.

When all the components identified and added to the dependency chart have been processed, another component of the dependency chart, not yet processed, may be, the case arising, selected at step 505. As indicated previously, if no component is associated with a root of the rule chart, those roots may be deleted (virtually) and the step is repeated with the resulting rule chart.

The algorithm may terminate when all the components of the cluster associated with the rule chart (and the components which depend thereon) have been processed.

Thus, a dependency chart may be created from the components present in the list of components by adding dependent components on the basis of dependency rules, by adding dependency links, and by modifying the nodes of the chart to add actions according to the dependency rules concerned. In other words, when a component is processed via a dependency rule, the script DepsFinder may be called. In an embodiment, the components determined by that script, upon which an action must be performed before performing the action concerning the processed component, not appearing in the dependency chart, are added to it. All the components to be processed (components of the list of components and components upon which those components depend) form a set of components to process. When a component is processed, it is withdrawn from that set. The process of generating the dependency chart terminates when that set is empty.

The algorithm described with reference to FIG. 5 is now illustrated, with reference to FIGS. 6a to 6f according to the example illustrated in FIGS. 3 and 4.

The first step of the algorithm for constructing the dependency chart may comprise creating a chart comprising the components specified in the list of components to which may be applied the administration command concerned, that is to say, according to the example described with reference to FIG. 3, the daemon nfs1 (nfs1#nfsd@soft), the cold door cd0 (cd0#colddoor@hw) and the server nfs2 (nfs2#nfs@node), as represented in FIG. 6a.

As represented in FIG. 4, the rule chart linked to that example may only comprise one root concerning the rule for stopping a cold door (colddoorOff). This rule is associated here with the cold door cd0. This component is thus selected as first component in accordance with step 505.

Figure 6B:
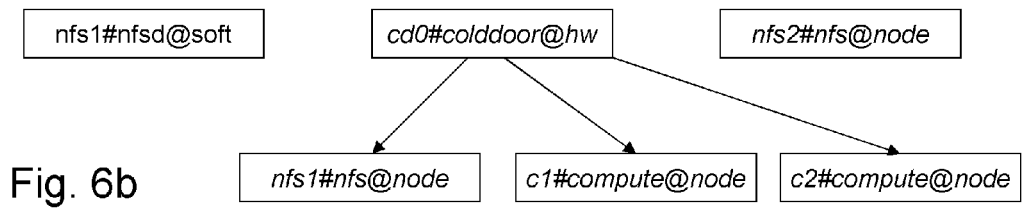

The script DepsFinder linked to the stopping of the cold door cd0 makes it possible to identify the compute server c1 (c1#compute@node), the compute server c2 (c2#compute@node) as well as the server nfs1 (nfs1#nfs@node). These components may then be added to the dependency chart with the corresponding dependency links, as illustrated in FIG. 6b.

Figure 6C:
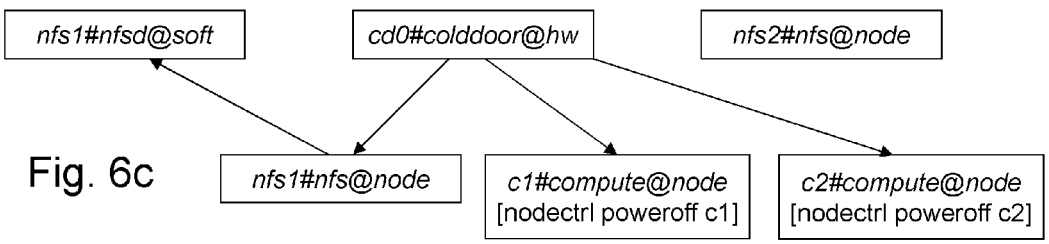

The node c1 may then be selected as well as the dependency rule nodeOff (linked to the rule for stopping the cold door cd0). The corresponding script DepsFinder returns nothing (the stopping of the node does not depend here on another component). The action of the rule associated with node c1 is stored (as illustrated in FIG. 6c). This action concerns a function for controlling a node (nodectrl) having as parameters poweroff in order to specify the type of control to perform (stopping a node) and c1 to identify the node concerned by the action. Node c2 may be processed in similar manner.

In similar manner, node nfs1 is processed. Again, the dependency rule nodeOff (linked to the rule for stopping the cold door cd0) applies here. The corresponding script DepsFinder identifies the associated NFS daemon (nfs1#nfsd@soft). This component is then added to the dependency chart with the corresponding dependency link (as illustrated in FIG. 6c).

Figure 6D:
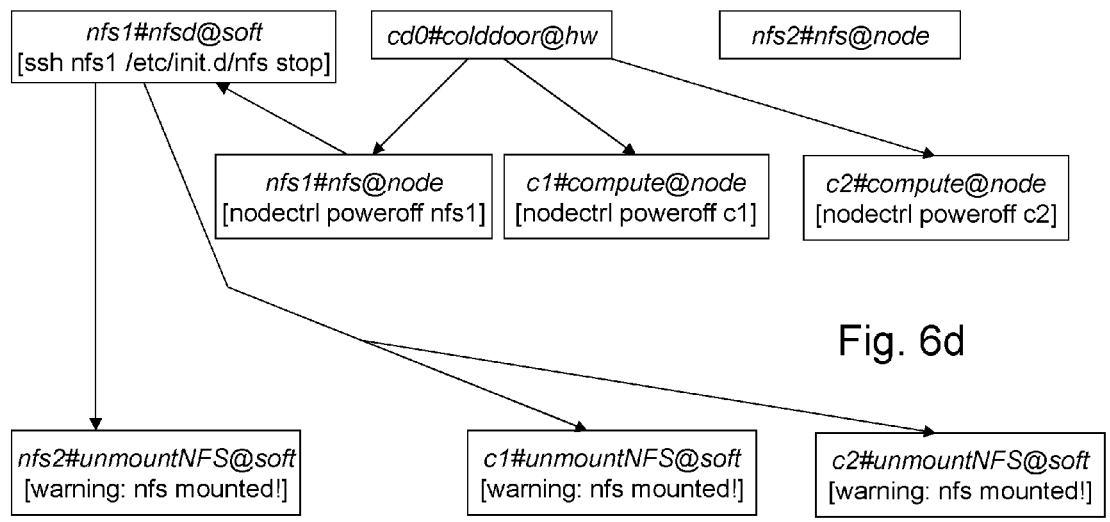

In recursive manner, the component nfs1#nfsd@soft is processed. Three new components (NFS clients linked to the nodes c1, c2, and nfs2) are then created (c1#unmountNFS@soft, c2#unmountNFS@soft and nfs2#unmountNFS@soft) in the dependency chart with the corresponding dependency links. As these new components have no dependency, the associated actions are stored in memory, then those of the component nfs1#nfsd@soft and lastly those of the component nfs1#nfs@node, as illustrated in FIG. 6d.

In a following iteration, the action associated with the cold door may be stored.

In the list of components, comprising the daemon nfs1 (nfs1#nfsd@soft), the cold door cd0 (cd0#colddoor@hw) and the server nfs2 (nfs2#nfs@node), only the cold door cd0 has been processed. However, when processing the cold door cd0, the daemon nfs1 was processed incidentally. Consequently, only the server nfs2 (nfs2#nfs@node) remains to be processed. Again, the first component associated with a root of the rule chart (represented in FIG. 4) is sought. As no component is associated with the root ColddoorOff (the cold door cd0 has already been processed and there is no other component), that root is removed (virtually) from the rule chart. In the resulting rule chart, it is the rule node Off which is the root. The server nfs2, corresponding to the rule nodeOff; is thus selected.

Figure 6E:
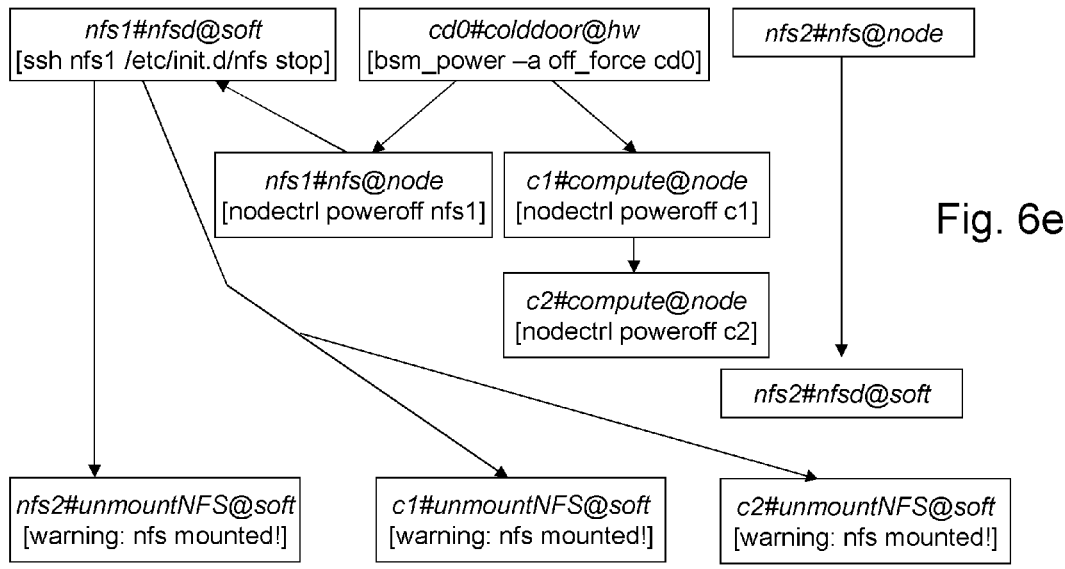

The script DepsFinder associated with the server nfs2 according to the rule node Off makes it possible to identify the daemon nfs2 (nfs2@nfsd@soft). This component is thus added to the dependency chart with the corresponding dependency link, as illustrated in FIG. 6e.

The daemon nfs2 is then selected to determine its dependencies, here c1#unmountNFS@soft, c2#unmountNFS@soft and nfs1#unmountNFS@soft. As the components c1#unmountNFS@soft and c2#unmountNFS@soft have already been added to the dependency chart, only the component nfs1#unmountNFS@soft is added to that chart, a dependency link being added to each of those components. In recursive manner, it is determined that those components have no dependency. The actions associated with those components may then be stored.

It is observed here that the same action may not be stored twice for the same node. However, different actions, coming from different dependency rules, may be associated with the same node of the dependency chart. In other words, a given dependency rule can only be applied once to a given component whereas several distinct dependency rules may be applied to the same component which may lead to the association of several actions with the same node of the dependency chart.

Figure 6F:
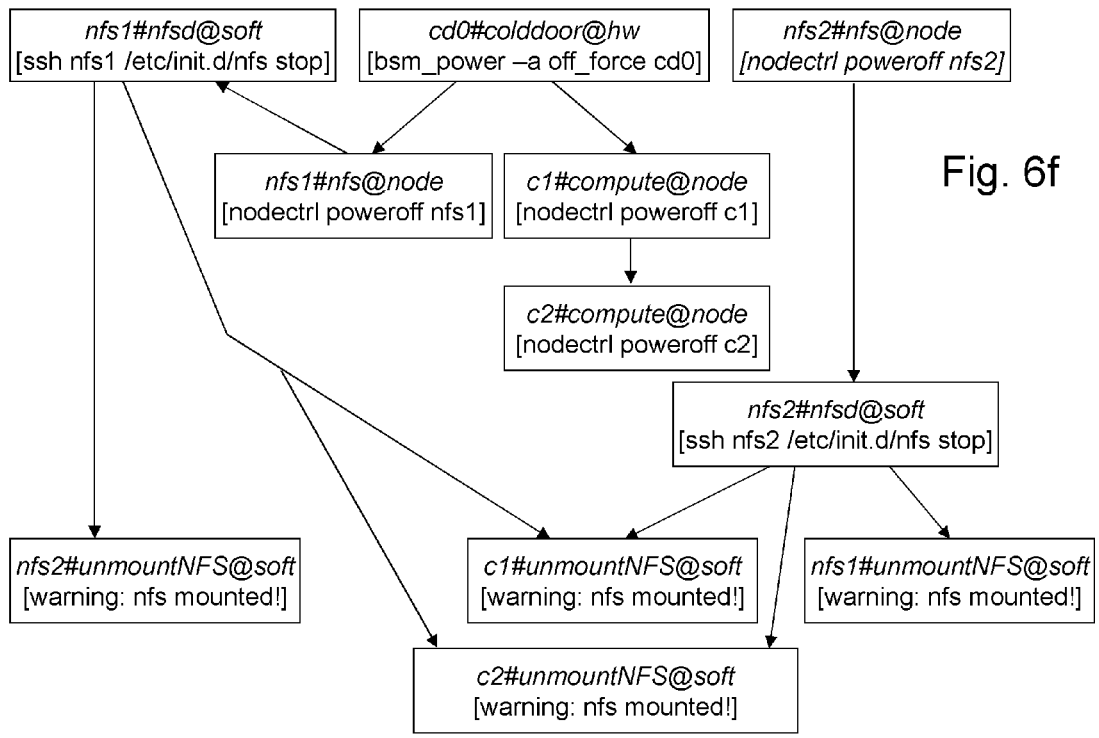

By moving up in the structure of the dependency chart, it is then possible to associate the actions with the components dependent on the components processed previously as illustrated in FIG. 6f which represents the dependency chart on the basis of which a sequence of instructions may be generated.

It is observed here that, if a cycle is observed in the dependency chart, the process may be terminated, and the problem may be indicated to the user.

Several algorithms may be used to generate a sequence of instructions, to execute the actions on the basis of a dependency chart. However, whatever the algorithm used, a sequence of instructions is advantageously represented in the form of a file of XML type (XML standing for eXtensible Markup Language), to be easily readable and modifiable by a user.

According to an embodiment, a sequence of instructions is obtained on the basis of a dependency chart using a standard topological sorting algorithm. The sequence of instructions obtained corresponds to a trivial path through the chart, ensuring the constraints are complied with. However, although such an algorithm may be easy to implement and complies with the determined constraints, it may not enable parallel execution of certain instructions. Furthermore, if an instruction cannot be executed (for example further to an execution error), it is possible, according to the execution mode chosen, for the following instructions not to be executed, even if they do not depend on the instruction that cannot be executed.

According to another embodiment, the instructions are organized in such a manner as to be executed in parallel. The instructions the execution of which depends on the execution of other instructions are placed on standby until the execution of the latter. As soon as an instruction or a set of instructions is successfully executed, those dependent thereon are executed. Such an embodiment gives good performance. However, the representation of the sequences of instructions so generated may be difficult to understand, and therefore to modify, for a user.

Another embodiment is directed to combining the parallel and sequential approaches described earlier, that is to say, for example, to execute instructions in parallel by level. For such purposes, the peaks of the dependency chart representing leaves are identified. In the example described with reference to FIG. 6, these peaks correspond to the following components,

--- c1#unmountNFS@soft [warning: nfs mounted!];
c2#unmountNFS@soft [warning: nfs mounted!];
nfs1#unmountNFS@soft [warning: nfs mounted!];
nfs2#unmountNFS@soft [warning: nfs mounted!];
c1#compute@node [nodectrl poweroff c1]; and,
c2#compute@node [nodectrl poweroff c2].

---

The instructions associated with those peaks then form a first set of instructions which may be executed in parallel, per group (each group corresponding to a peak).

The peaks so identified are then removed (virtually) from the dependency chart and the peaks of the resulting dependency chart representing leaves are identified. In the example considered, these peaks correspond to the following components,

--- nfs1#nfsd@soft [ssh nfs1 /etc/init.d/nfs step] ; and
nfs2#nfsd@soft [ssh nfs2 /etc/init.d/nfs step].

---

The instructions associated with those peaks then form a second set of instructions which may be executed in parallel, per group (each group corresponding to a peak), after the first set of instructions has been executed.

Again, the peaks identified are removed (virtually) from the dependency chart and the peaks of the resulting dependency chart representing leaves are identified. In the example considered, these peaks correspond to the following components,

--- nfs1#nfs@node [nodectrl poweroff nfs1]; and,
nfs2#nfs@node [nodectrl poweroff nfs2].

---

The instructions associated with those peaks then form a third set of instructions which may be executed in parallel, per group (each group corresponding to a peak), after the first and second sets of instructions have been executed.

Again, the peaks identified are removed (virtually) from the dependency chart and the peaks of the resulting dependency chart representing leaves are identified. The instructions associated with the sole remaining peak (cd0# colddoor@hw [bsm_power−a off_force cd0]) then form a fourth set of instructions which may be executed in parallel, after the first, second and third sets of instructions have been executed.

Appendix A3 illustrates an example of an XML file corresponding to such an embodiment. The tag <seq> indicates a section of groups of instructions to be processed sequentially whereas the tag <par> indicates sections of groups of instructions to be processed in parallel. Thus, for example, the group of instructions comprising the identifiers 1, 2, 3 and 4 may be processed before the group of instructions comprising the identifiers 5 and 6 whereas the instructions linked to the identifiers 1, 2, 3, and 4 are advantageously processed in parallel.

Such a representation is easy to understand for a user who may thus modify it in order to adapt it if required.

According to another embodiment, a single group of parallel instructions (<par> XML tag) may be generated including for each node of the dependency chart, an instruction whose dependencies are explicitly stated using a particular attribute.

In another embodiment, a sequence of instructions (optimal) is generated of XML type in a more readable manner. Implicit dependencies generated by sequential instructions are used. A sequence of instructions so generated may then be executed. Advantageously, the actions concerned by the instructions may be unitary (each instruction may only concern one component) and atomic (obtaining an indication of the result of executing the instruction) in order to verify the execution of the sequence of instructions.

Atomicity may in particular be obtained by receiving a notification of instruction execution of OK type if the instruction was correctly executed, NOK if the instruction was not correctly executed or WARNING if the execution of the instruction may lead to a perturbation of components of the cluster (for example the stopping of an NFS server when a node is a client of that server). In the case of a WARNING, the execution of an instruction linked to a component dependent on the execution of that instruction having produced a WARNING may be submitted for acceptance by a user or forced by the system to have a selected mode of execution (for example forced or not). The notification OK may, in certain embodiments, constitute a contribution to process by an instruction dependent on the execution of that instruction.

It is thus possible to manage failures in order, for example, not to stop a cold door if at least 50% of the nodes have not been stopped (for example if a node refuses to stop).

Figure 7:
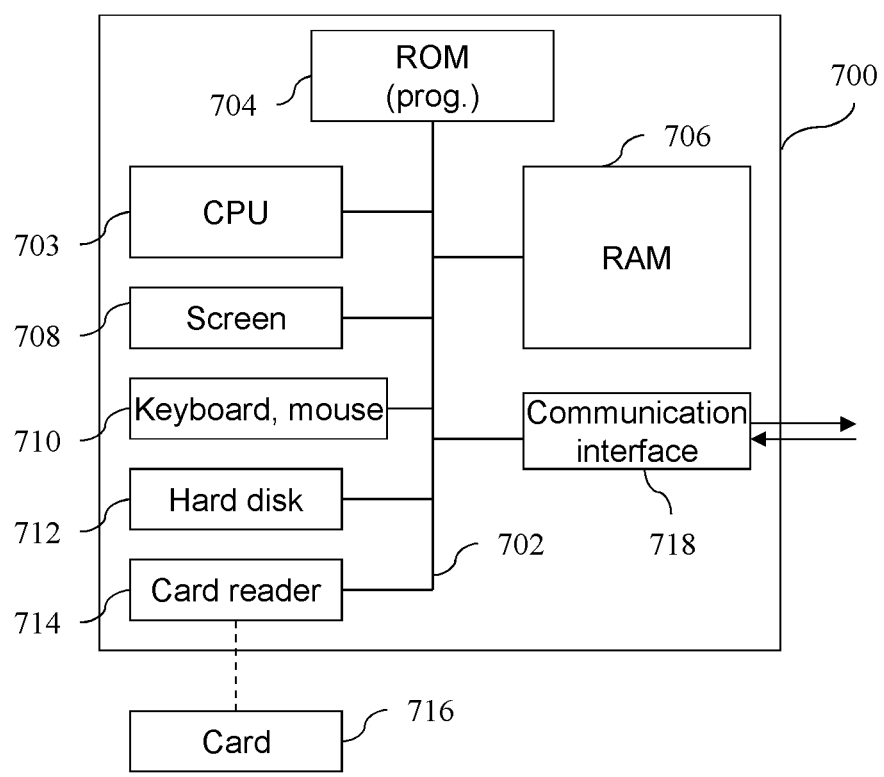
FIG. 7 illustrates an exemplary device adapted to implement the method disclosed herein.

A device adapted to implement the method or a part of the method, in particular the algorithms described with reference to FIGS. 2 and 5, is illustrated in FIG. 7. The device 700 is for example a computer of PC type (PC standing for Personal Computer).

The device 700 here comprises a communication bus 702 to which there are connected:
- a central processing unit or microprocessor 703 (or CPU, standing for Central Processing Unit);
- a read only memory 704 (ROM, acronym for Read Only Memory) able to contain the programs "Prog";
- a random access memory or cache memory 706 (RAM, acronym for Random Access Memory), comprising registers adapted to record variables and parameters created and modified during the execution of the aforementioned programs; and,
- a communication interface 718 adapted to transmit and to receive data. The device 700 furthermore may comprise:
- a screen 708 making it possible to view data and/or serving as a graphical interface with the user who will be able to interact with the programs, using a keyboard and a mouse 710 or another pointing device, such as an optical stylus, a touch screen or a remote control;
- a hard disk 135 able to contain the aforementioned programs "Prog" and data processed or to be processed; and,
- a memory card reader 714 adapted to receive a memory card 716 and to read or write thereon data processed or to be processed.

The communication bus allows communication and interoperability between the different elements included in the device 700 or connected to it. The representation of the bus is non-limiting and, in particular, the central processing unit may communicate instructions to any element of the device 700 directly or by means of another element of the device 700.

The executable code of each program enabling the programmable device to implement the methods may be stored, for example, on the hard disk 712 or in read only memory 704.

According to a variant, the memory card 716 can contain data as well as the executable code of the aforementioned programs which, once read by the device 700, will be stored on the hard disk 712.

According to another variant, it will be possible for the executable code of the programs to be received, at least partially, via the interface 718, in order to be stored in identical manner to that described previously.

More generally, the program or programs may be loaded into one of the storage means of the device 700 before being executed.

The central processing unit 703 will control and direct the execution of the instructions or portions of software code of the program or programs, these instructions being stored on the hard disk 712 or in the read-only memory 704 or in the other aforementioned storage elements. On powering up, the program or programs which are stored in a non-volatile memory, for example the hard disk 712 or the read only memory 704, are transferred into the random-access memory 706, which then contains the executable code of the program or programs, as well as registers for storing the variables and parameters necessary for implementation of the method and device.

Naturally, to satisfy specific needs, a person skilled in the art will be able to apply modifications in the preceding description.

APPENDIX

Calcul_[1-3]#islet@hw_group
CC-[1-10]#CC@rack
bullx[10-11]#mds@node
bullx[12-20]#compute@node
hwm[101-110]#bmc@hwmanager
colddoor[0-5]#coldoor@hwmanager
esw-CU[2-3]-1#eth@switch
foo[1-5]#bar@soft A1: Component List Example

| Rule Set | Symbolic name | Comp. type | Filter | Action | Deps Finder | Depends On | Comments |
|---|---|---|---|---|---|---|---|
| Stop | nodeOff | compute @node OR nfs @node | all | Nodectrl poweroff %comp. | find_node_ deps %comp. | nfsDown 20% | Powering off compute and nfs nodes |
| Start | nodeOn | compute @node | %name !~ compute 12 | nodectrl poweron %comp. | find_ nodeon_ deps %name | Colddoor Start 100% | Power on cold door before nodes |
| Stop | colddoorOff | colddoor @hw | all | Bsm_power off %comp. | find_ colddoor Off_dep %comp. | nodeOff 50% | Power off nodes before a cold door |
| ... | ... | ... | ... | ... | ... | ... | ... |
| Stop | daOff | all@da | Bash -c '[[ %comp. =.* ]]' | da_admin poweroff \ %comp. | find_da_ deps %comp. | ioServer Off 100% | Powering off disk arrays requires their clients to be powered off first |

| Rule Set | Symbolic name | Comp. type | Filter | Action | Deps Finder | Depends On | Comments |
|---|---|---|---|---|---|---|---|
| Stop | nfsDown | nfsd@soft | all | ssh %comp. /etc/init.d/nfs stop | Find__nfs client %comp. | unmount NFS 100% | Stopping NFS daemons: take care of clients |
| Stop | unmountNFS | unmount NFS@soft | all | Warning : nfs mounted ! | none | none | Display a warning message for each client |

A2: Example of Dependency Rules

```
<seq>
  <par>
    <action component_set="c1#unmountNFS@soft" id="1">
      echo "WARNING : nfs mounted";
    </action>
    <action component_set="nfs1#unmountNFS@soft" id="2">
      echo "WARNING : nfs mounted";
    </action>
    <action component_set="nfs2#unmountNFS@soft" id="3">
      echo "WARNING : nfs mounted";
    </action>
    <action component_set="c1#compute@node" id="4">
      nodectrl poweroff c1;
    </action>
  </par>
  <par>
    <action component_set="nfs1#nfsd@soft" id="5">
      ssh nfs1 /etc/init.d/nfs stop
    </action>
    <action component_set="nfs2#nfsd@soft" id="6">
      ssh nfs2 /etc/init.d/nfs stop
    </action>
  </par>
  <par>
    <action component_set="nfs1#nfs@node" id="7">
      nodectrl poweroff nfs1
    </action>
    <action component_set="nfs2#nfs@node" id="8">
      nodectrl poweroff nfs2
    </action>
  </par>
  <action component_set="cd0#coldoor@hw" id="9">
    nodectrl poweroff cd0
  </action>
</seq>
```

A3: Example of an XML File Representing a Sequence of Instructions

```
<seq>
  <action id="1" provides="a"/>
  <par>
    <action id="2" provides="b" requires="a:0"/>
    <action id="3" provides="b" requires="a:100"/>
    <action id="4" provides="c" requires="a:50"/>
  </par>
  <par>
    <action id="5" provides="d"/>
    <action id="6" provides="d" requires="b:100,c:0"/>
    <action id="7" provides="e" requires="b:0,c:100"/>
  </par>
  <par>
    <action id="8" deps="1" provides="e" requires="a:0, d:50, e:100"/>
    <action id="9" deps="1,2,3,4" provides="f" requires="a:50, b:50, c:50 "/>
  </par>
  <action id="10"/>
</seq>
```

A4: Example of an XML File Representing a Sequence of Instructions for Executing Actions 1 to 10

What is claimed is:

1. A computerized method for managing a computer system cluster by processing a global command pertaining to a plurality of components of a set of components of the computer system cluster, the global command specifying the execution of a respective action for each of the plurality of components, in which each of the plurality of components has a component type from a plurality of component types, and dependency links between the components, as defined by dependency rules, are based on the global command to be processed, the method comprising for each action:

identifying the component subject to the action defined by the global command;

identifying, according to at least one dependency rule linked to the global command, components of the plurality of components that must be processed in advance of the subject component;

attributing, for each component type from the plurality of component types, of each of the components that must be processed in advance, a weighting factor for that component type that represents a proportion of the components of that type for which corresponding actions must be successfully completed, based on the dependency rules, before executing the action on the subject component; and executing the action on the subject component, if for each component type that must be processed in advance, the corresponding actions are successfully completed for a proportion of the components of that type that is at least equal to the respective weighting factor, wherein the actions specified by the global command are processed according to an ordered sequence of instructions that is determined from a dependency chart, and wherein the sequence of instructions comprises at least one group of instructions for each level of the dependency chart, the instructions of the at least one group for each of the levels being executed in parallel, and the instructions from level to level being executed sequentially.

2. The method according to claim 1, wherein the execution of an action on a first component generates a contribution, that contribution being processed to determine whether the action on a component that depends on the first component may be executed or not.

3. The method according to claim 2 further comprising a step of executing the sequence of instructions.

4. The method according to claim 3 further comprising: displaying information relative to the sequence of instructions; and executing the sequence of instructions being carried out in response to a validation of the information displayed relative to the sequence of instructions.

5. The method according to claim 1, wherein the dependency chart is generated from dependency rules and a list of the components concerned by the global command.

6. The method according to claim 5, wherein an identification function for identifying components and a dependency rule are associated with the at least one dependency rule linked to the command, the method further comprising identifying at least the other component from the identification function, the dependency chart being generated from the at least one identified component, from the at least one other component, from the at least one identified dependency rule and from the dependency rule associated with the at least one dependency rule linked to the command.

7. The method according to claim 5, wherein generating a dependency chart is recursive and comprises:
creating an initial dependency chart comprising at least the at least one component;
selecting a component in the dependency chart:
identifying at least one component on which the selected component is dependent in view of a dependency rule; and
modifying the dependency chart according to the selected component and the at least one identified component on which the selected component is dependent in view of a dependency rule.

8. The method according to claim 7, wherein selecting a component in the dependency chart is based on a rule chart, the rule chart being an ordered representation of the at least one identified dependency rule and dependency rules directly or indirectly associated with the at least one identified dependency rule.

9. The method according to claim 1 further comprising a step of displaying information relative to the dependency chart, the step of generating the sequence of instructions being carried out in response to a validation of the information displayed relative to the dependency chart.

10. The method according to claim 1, wherein the sequence of instructions are obtained on the basis of the dependency chart using a standard topological sorting algorithm.

11. The method according to the claim 1 wherein the sequence of instructions is generated in the form of a file of extensible markup language (XML) type, a level tag being associated with each level of the dependency chart and a group tag being associated with each group of instructions for each tag of level corresponding to a level for which there are at least two distinct groups of instructions.

12. The method according to claim 11, wherein instructions relative to two distinct levels of the dependency chart are executed sequentially and according to chart instructions of distinct groups of instructions of the same level of the dependency chart are executed in parallel.

13. The computer program comprising instructions adapted for the carrying out of each of the steps of the method according to claim 1 when the program is executed on a computer.

14. A device comprising a communication bus operating to interconnect a microprocessor, at least one memory structure, and a communication interface structure, which are adapted for implementing the method according to claim 1.

15. A non-transitory computer readable medium encoded with instructions for directing a computer or processor to carry out the method according to claim 1 when the instructions are executed on the computer.

16. The method according to claim 1, wherein the action is selected from a plurality of different actions, each respective action having a respective weighting factor based on the dependency rules such that the weighting factor depends on a contribution of a preceding action and on a degree of dependency of the action on the preceding action.

17. The method according to claim 16, wherein the weighting factor further depends on respective weighting factors of a plurality of preceding actions and on respective degrees of dependencies of the action on the preceding action.

* * * * *